(12) United States Patent
Perreaux et al.

(10) Patent No.: US 11,401,791 B2
(45) Date of Patent: Aug. 2, 2022

(54) METHOD AND SYSTEM FOR MIXING LIQUID AND GAS THAT HAVE BEEN SEPARATELY INJECTED INTO A WELL COMPRISING TWO COAXIAL CYLINDERS AND DISCHARGING THE LIQUID/GAS MIXTURE INTO AN UNDERGROUND FORMATION

(71) Applicants: IFP Energies nouvelles, Rueil-Malmaison (FR); STORENGY SAS, Bois Colombes (FR); GRAZIELLA GREEN POWER, Arezzo (IT)

(72) Inventors: Marc Paul Perreaux, L'Etang-la-Ville (FR); Martin Gainville, Rueil-Malmaison (FR); Laurent Jeannin, Saint Germain de la Grange (FR)

(73) Assignees: IFP ENERGIES NOUVELLES, Rueil-Malmaison (FR); STORENGY SAS, Bois Colombes (FR); GRAZIELLA GREEN POWER, Arezzo (IT)

( * ) Notice: Subject to any disclaimer, the term of this patent is extended or adjusted under 35 U.S.C. 154(b) by 0 days.

(21) Appl. No.: 17/287,382

(22) PCT Filed: Oct. 3, 2019

(86) PCT No.: PCT/EP2019/076799
§ 371 (c)(1),
(2) Date: Apr. 21, 2021

(87) PCT Pub. No.: WO2020/083623
PCT Pub. Date: Apr. 30, 2020

(65) Prior Publication Data
US 2021/0396109 A1 Dec. 23, 2021

(30) Foreign Application Priority Data

Oct. 22, 2018 (FR) ..................... 1871245

(51) Int. Cl.
*E21B 43/16* (2006.01)
*E21B 41/00* (2006.01)

(52) U.S. Cl.
CPC ........ *E21B 43/166* (2013.01); *E21B 41/0064* (2013.01)

(58) Field of Classification Search
CPC .................. E21B 43/166; E21B 41/0064
See application file for complete search history.

(56) References Cited

U.S. PATENT DOCUMENTS

| 4,632,601 A | 12/1986 | Kuwada |
| 5,022,787 A | 6/1991 | Kuragasaki et al. |

(Continued)

FOREIGN PATENT DOCUMENTS

| JP | H09-177507 A | 7/1997 |
| JP | 2008-307483 A | 12/2008 |

(Continued)

OTHER PUBLICATIONS

International Search Report for PCT/EP2019/076799, dated Dec. 5, 2019; English translation submitted herewith (6 pgs.).

*Primary Examiner* — Silvana C Runyan
(74) *Attorney, Agent, or Firm* — Fitch, Even, Tabin & Flannery, LLP

(57) ABSTRACT

A method and system enable injection of gas into an underground formation, enhanced by the simultaneous injection of liquid. Mixing of the gas and the liquid that have been separately injected into a well comprising two coaxial cylinders can occur at different levels in the well in order to facilitate the flow and to limit the gas pressure necessary for (Continued)

reinjection at the wellhead. Thus, the system and the method require less energy and the associated gas compression equipment is less expensive.

The method and system can be applied to geothermal energy applications, underground gas storage, notably $CO_2$, or to enhanced recovery in petroleum reservoirs.

21 Claims, 8 Drawing Sheets

(56) References Cited

U.S. PATENT DOCUMENTS

| | | | |
|---|---|---|---|
| 9,187,246 B2 * | 11/2015 | Hoier | E21B 41/0064 |
| 9,803,803 B1 * | 10/2017 | Adams | F17C 7/00 |
| 2007/0137852 A1 * | 6/2007 | Considine | E21B 43/2401 |
| | | | 166/60 |
| 2012/0003043 A1 * | 1/2012 | Cawley | E21B 43/164 |
| | | | 405/53 |
| 2017/0145800 A1 * | 5/2017 | Davidsen | E21B 43/16 |

FOREIGN PATENT DOCUMENTS

| | | |
|---|---|---|
| JP | 2012207605 A | 10/2012 |
| RU | 2512156 C1 | 4/2014 |

* cited by examiner

[Fig 2]
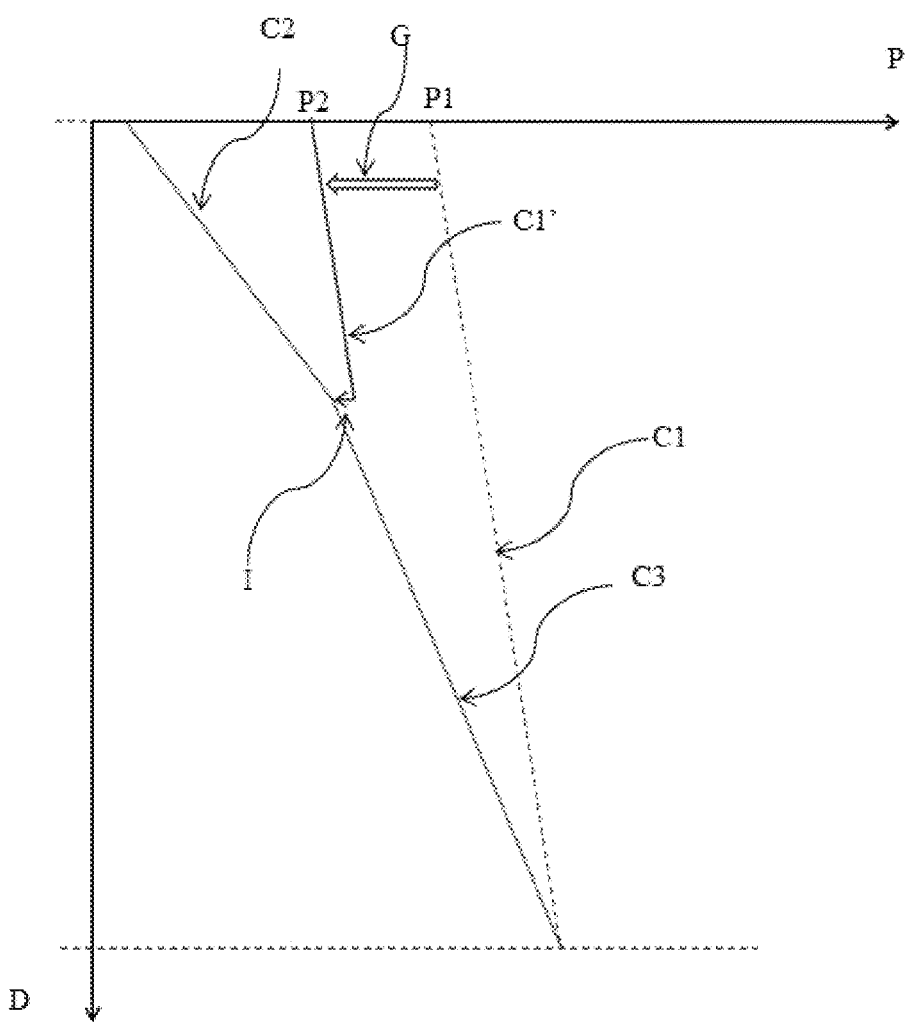

[Fig 3a]
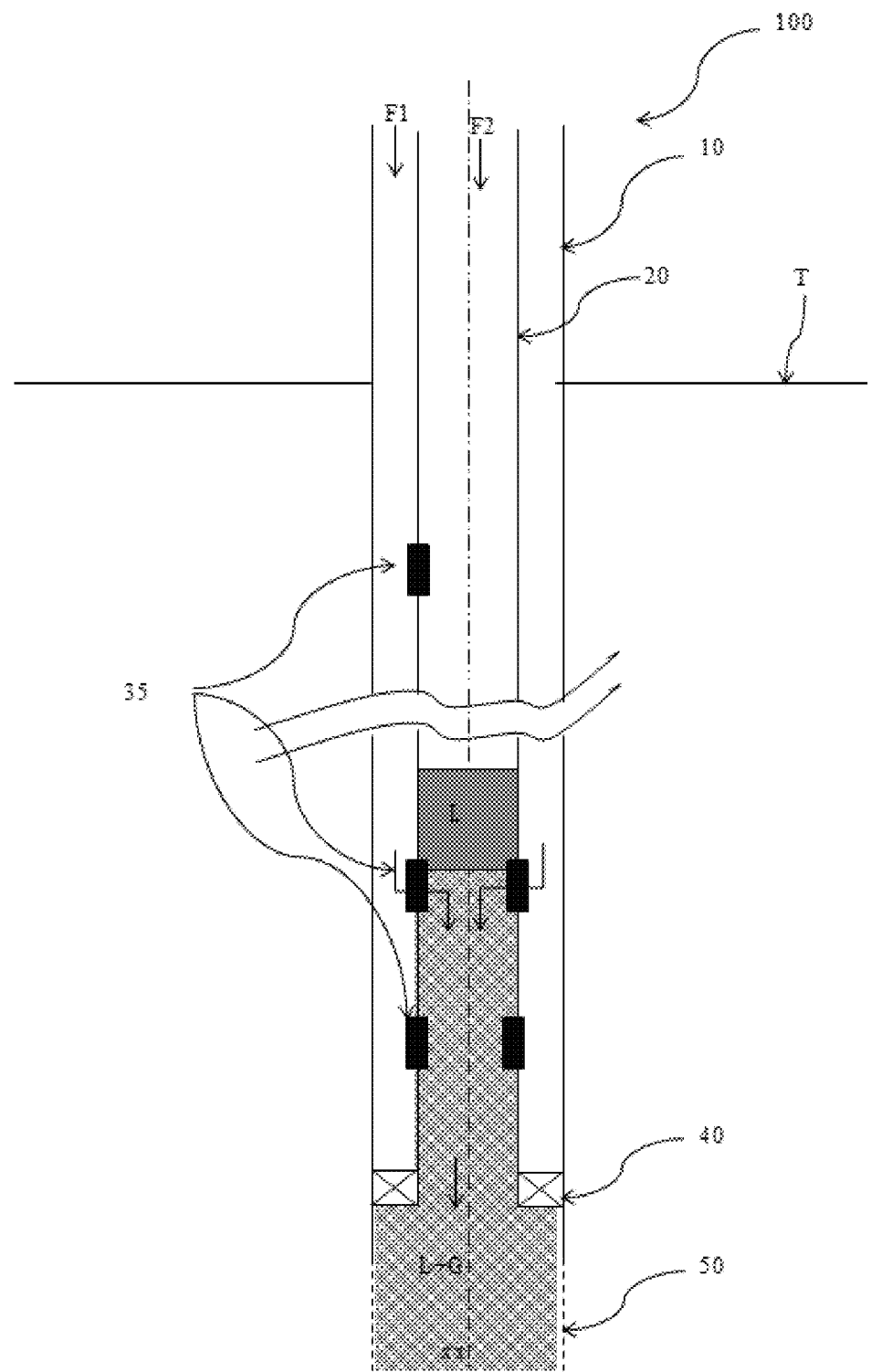

[Fig 4]
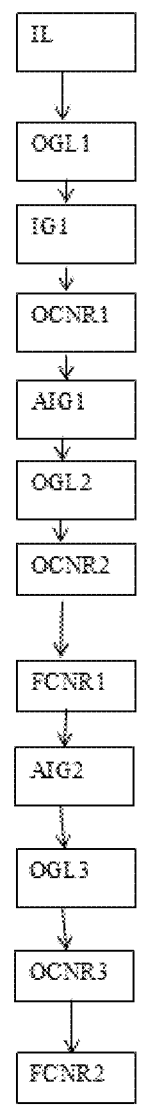

[Fig 5a]
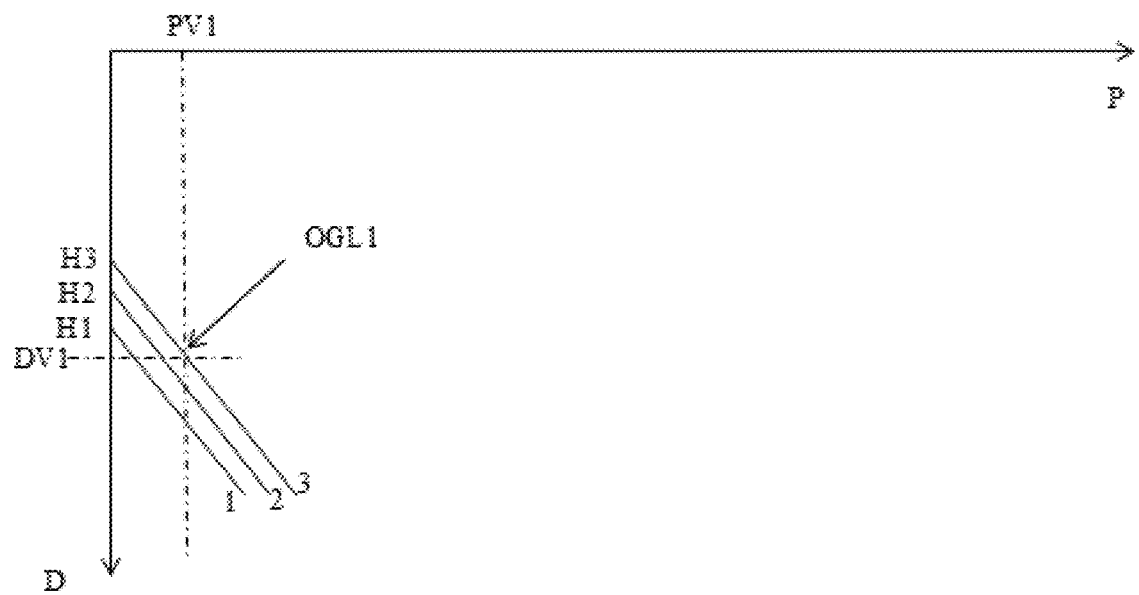
[Fig 5b]
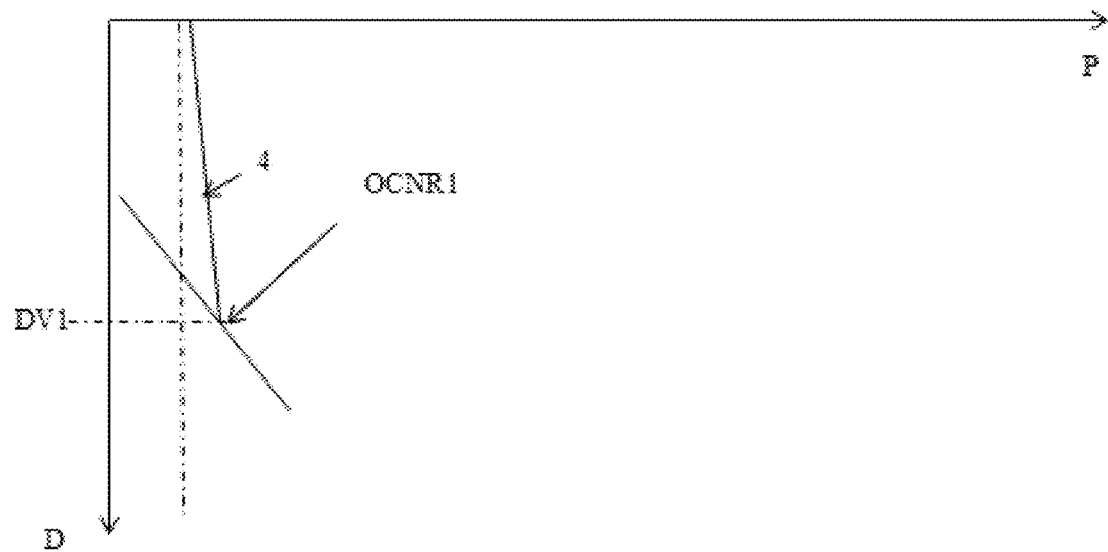

[Fig 5c]
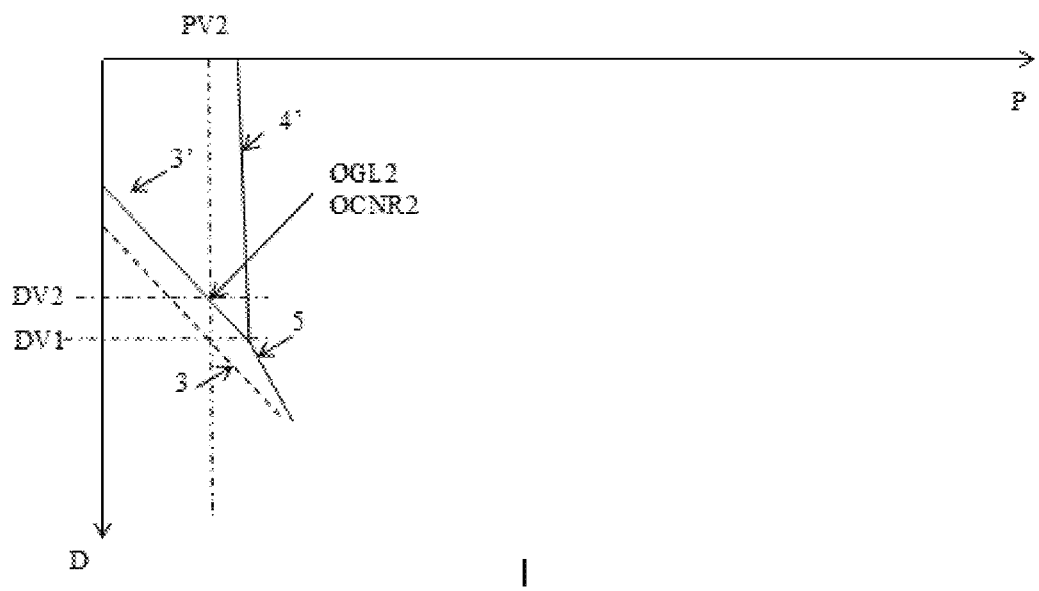
[Fig 5d]
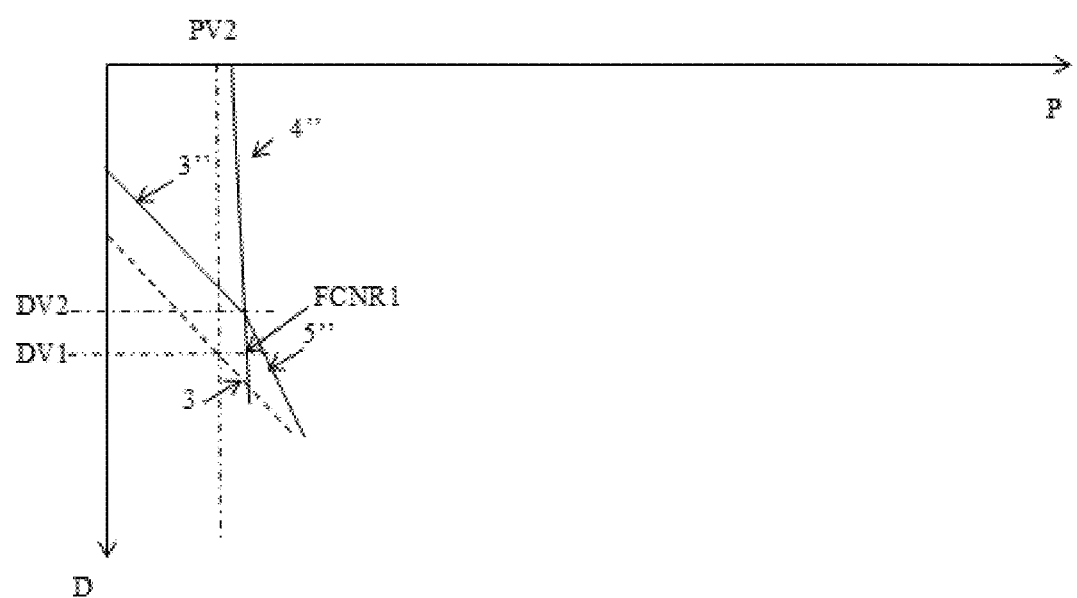

[Fig 6]
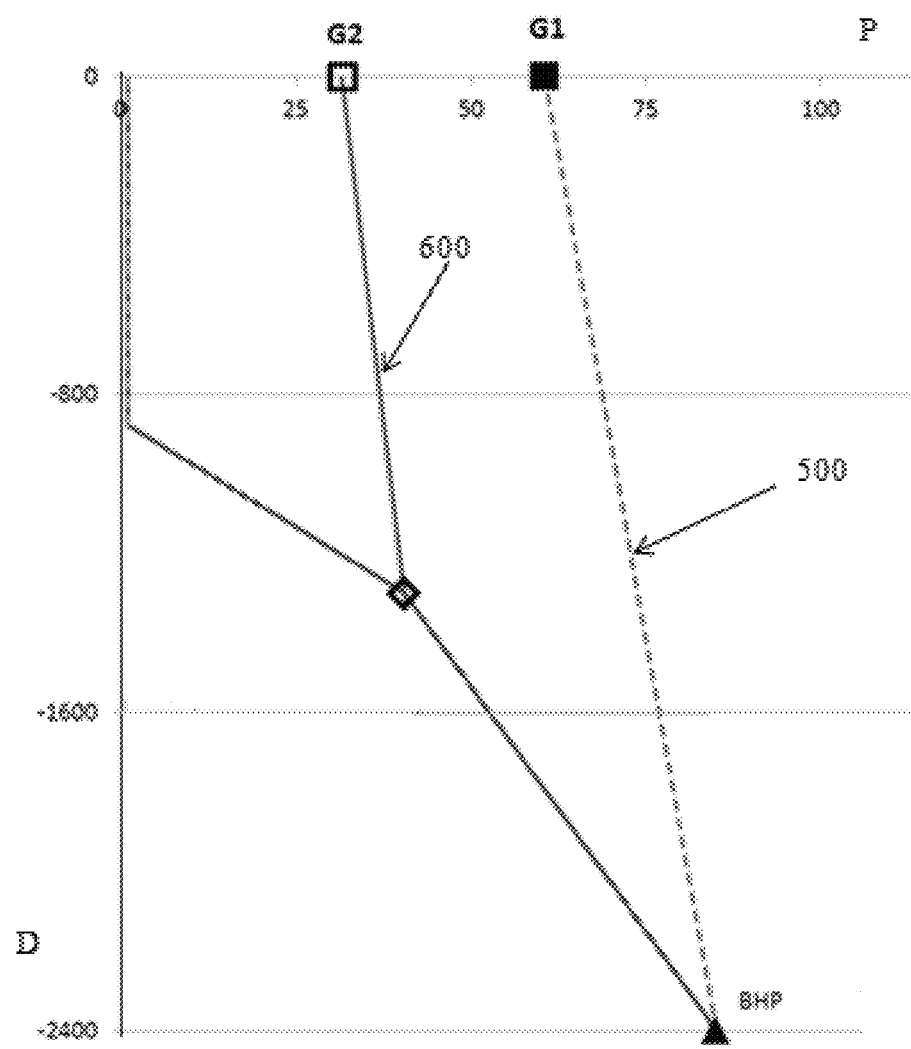

METHOD AND SYSTEM FOR MIXING LIQUID AND GAS THAT HAVE BEEN SEPARATELY INJECTED INTO A WELL COMPRISING TWO COAXIAL CYLINDERS AND DISCHARGING THE LIQUID/GAS MIXTURE INTO AN UNDERGROUND FORMATION

CROSS-REFERENCE TO RELATED APPLICATIONS

This application is a U.S. national phase application filed under 35 U.S.C. § 371 of International Application No. PCT/EP2019/076799, filed Oct. 3, 2019, designating the United States, which claims priority from French Patent Application No. 18/71.245, filed Oct. 22, 2018, which are hereby incorporated herein by reference in their entirety.

FIELD OF THE INVENTION

The present invention relates to the field of gas injection into an underground formation. Gas injection into the subsoil is a widely spread operation in the petroleum industry, notably in the context of EOR (Enhanced Oil Recovery) techniques by injecting natural gas or $CO_2$ into petroleum reservoirs so as to improve oil recovery. There are currently many $CO_2$ reinjection projects for EOR around the world. Alternate injection of water and gas is also provided for EOR (Water Alternating Gas (WAG) injection).

$CO_2$ injection into an underground medium is also used for projects of $CO_2$ sequestration in the subsoil to limit greenhouse effect and to reduce the impact thereof on climate change. There are currently four industrial CCS (Carbon Capture and Sequestration) projects in operation in the world, allowing to store 5 million tons of $CO_2$ per year.

The gas can be injected alone with a wellhead pressure corresponding to a gas pressure gradient across the depth of the well. This solution requires significant gas compression means, resulting in high energy consumption and investment costs.

BACKGROUND OF THE INVENTION

Technologies using simultaneous injection of gas and liquid into a single well, based on the complete dissolution of the gas in the liquid within the well, gas injection being performed by means of a central injection lance, are known for example from the Carbfix solution (collaborative research project), tested and approved on the Hellisheidi site in Iceland, or from patent application U.S. Pat. No. 4,632,601 A. A low gas volume to liquid volume ratio is necessary for total dissolution of the gas in the liquid. These technologies therefore limit the rate of gas injection into the well.

Other devices enabling simultaneous two-phase reinjection of a gas and a liquid have been proposed. Magma Energy Italia, GeothermEx and Schlumberger Software, and patent application JP-2012/207,605 A provide an injection lance centered in the well. Using this small-diameter lance makes it impossible to carry out slickline operations, which enable maintenance work (valve disassembly, plug setting, pressure and/or temperature measurement for example). Patent application JP-9,177,507 A uses a specific device for mixing the liquid and the gas in the well. These simultaneous two-phase injection technologies use a single injection point, thus making the operation of starting the two-phase flow more complex and/or limiting the two-phase flow over a short well length.

Patent application U.S. Pat. No. 5,022,787 A proposes mixing the gas and the water directly at the wellhead: the gas can therefore not be injected into a stabilized water column. This solution does not enable easy mixing of the two fluids or guarantee a two-phase flow in the well, since initiation of the flow can be difficult in low-pressure and high-injectivity reservoirs.

Among these systems, some require high gas pressures at the wellhead, resulting in high installation costs.

Besides, one drawback of these systems lies in the potentially high energy consumption, in particular when starting the system.

Furthermore, these systems lack flexibility as regards the operating conditions variability and the real conditions of injection in the site.

In order to overcome these drawbacks, the present invention relates to a method and to a device for injecting a gas into an underground formation through a well comprising at least two coaxial cylinders delimiting a central volume and an annular volume, and an outlet for the liquid/gas mixture. The wellhead located in the upper part, above ground level, comprises a liquid inlet and a gas inlet. The coaxial cylinders serve for circulation of the liquid and the gas, each from a distinct inlet, towards a common liquid/gas mixture outlet located at the foot of the well. Several communication ports (injection points) between the coaxial cylinders, provided with opening/closing means or not, allow injection of one of the fluids from one of the two volumes into the other volume, so as to create a mixing zone. The method comprises the following steps:

a) separate injection of liquid from the liquid inlet and of gas from the gas inlet, one into the central volume and the other into the annular volume, b) liquid and gas mixing. One of the two fluids therefore flows radially through the central cylinder to join the fluid on the other side of the central cylinder. Preferably, the central cylinder substantially extends over the entire length of the well. Mixing occurs through injection points longitudinally distributed over the cylinder, which can be opened or closed, c) discharge of the liquid/gas mixture thus obtained through the gas/liquid mixture outlet to transfer it into the underground formation.

This method provides high modularity and optimization of the injection conditions. Notably, the gas injection pressure at the wellhead can be reduced, thus allowing to reduce the compression energy consumption of the surface units. The modularity of the method makes it possible to modify the injection altitude(s) so as to adapt the injection altitude(s) to the context (well conditions, injectivity, pressure, flow rates, etc.). The method according to the invention also allows to secure the two-phase flow formed in the well and to provide recompression of the mixture.

The invention also relates to a system for implementing the method exhibiting the aforementioned features. Reducing the required gas pressure at the wellhead generates a reduction in the cost of the gas compression facilities and a decrease in the energy consumption.

SUMMARY OF THE INVENTION

The invention relates to a method for injecting gas into an underground formation through a well, the well comprising two coaxial cylinders delimiting a central volume and an annular volume. Said well comprises a wellhead. Said wellhead comprises a liquid inlet and a gas inlet, and said well also comprises a gas/liquid mixture outlet. Said gas flows from said gas inlet to said liquid/gas mixture outlet and said liquid flows from said liquid inlet to said liquid/gas mixture outlet. Said method comprises the following steps:

a) injecting said liquid from said liquid inlet and said gas from said gas inlet separately, one into said central volume and the other into said annular volume, b) mixing said liquid and said gas by causing one of these two fluids to flow radially through said central cylinder by opening or closing at least one injection point among at least two injection points, said at least two injection points being distributed along said central cylinder, the central cylinder substantially extending over the entire length of the well, and c) discharging a liquid/gas mixture thus obtained at said gas/liquid mixture outlet to transfer it into said underground formation.

Advantageously, in step b), opening or closing of said at least two injection points follows an opening/closing sequence.

Preferably, said opening/closing sequence comprises opening of an injection point when the pressure of the fluid flowing through said central cylinder is higher than the pressure of the other fluid, at said injection point, and when the pressure of said liquid is higher than a predetermined pressure threshold, at said injection point.

Said predetermined pressure threshold is preferably different for each injection point.

According to one embodiment of the method of the invention:

a) said liquid is separately injected into said central volume and said gas into said annular volume, b) said liquid and said gas are mixed by causing said gas to flow radially through said central cylinder from said annular volume to said central volume by opening at least one injection point among at least two injection points distributed along said central cylinder, c) said liquid/gas mixture thus obtained is discharged at said gas/liquid mixture outlet, said liquid/gas mixture outlet being located at the foot of said central volume.

According to another embodiment of the method of the invention:

a) said liquid is separately injected into said central volume and said gas into said annular volume, b) said liquid and said gas are mixed by causing said liquid to flow radially through said central cylinder from said central volume to said annular volume by opening at least one injection point among at least two injection points distributed along said central cylinder, c) said liquid/gas mixture thus obtained is discharged at said gas/liquid mixture outlet, said liquid/gas mixture outlet being located at the foot of said annular volume.

According to another embodiment of the method of the invention:

a) said liquid is separately injected into said annular volume and said gas into said central volume, b) said liquid and said gas are mixed by causing said liquid to flow radially through said central cylinder from said annular volume to said central volume by opening at least one injection point among at least two injection points distributed along said central cylinder, c) said liquid/gas mixture thus obtained is discharged at said gas/liquid mixture outlet, said liquid/gas mixture outlet being located at the foot of said central volume.

According to another embodiment of the method of the invention:

a) said liquid is separately injected into said annular volume and said gas into said central volume, b) said liquid and said gas are mixed by causing said gas to flow radially through said central cylinder from said central volume to said annular volume by opening at least one injection point among at least two injection points distributed along said central cylinder, c) said liquid/gas mixture thus obtained is discharged at said gas/liquid mixture outlet, said liquid/gas mixture outlet being located at the foot of said annular volume.

Advantageously, the liquid and the gas are mixed through said at least two injection points evenly distributed on said central cylinder, along the well.

Preferably, the opening/closing sequence comprises the successive openings of the injection points starting from the lowest injection point of the well to the highest injection point of the well.

According to a variant of the method of the invention, the opening/closing sequence comprises the successive closings of the injection points starting from the lowest injection point of the well to the highest injection point of the well.

According to an embodiment of the method of the invention, during the step of mixing said liquid and said gas, the rate of injection of said fluid flowing radially through said central cylinder is progressively increased.

According to a variant of the method of the invention, during the step of mixing said liquid and said gas, the injection pressure of said fluid flowing radially through said central cylinder is controlled.

Advantageously, the superficial flow velocities of the fluids are greater than 1 m/s.

The invention also relates to a system for injecting gas into an underground formation for implementing the method according to one of the above features, comprising a well. Said well comprises two coaxial cylinders delimiting a central volume and an annular volume, and a wellhead. Said wellhead comprises a gas inlet and a liquid inlet, and said well comprises a gas/liquid mixture outlet. Said system comprises a means of carrying said gas from said gas inlet to said liquid/gas mixture outlet, and a second means of carrying said liquid from said liquid inlet to said liquid/gas mixture outlet. Furthermore, said system comprises a liquid injection means in said wellhead for injecting said liquid into one of the two volumes and a gas injection means in the wellhead for injecting said gas into the other volume. Said system also comprises at least two means for radial passage of one of the fluids through said central cylinder, said central cylinder preferably extending substantially over the entire length of said well, said at least two radial passage means being distributed along said well, these radial passage means comprising opening and closing means, valves or non-return valves for example.

Advantageously, said radial passage means comprises at least a valve and a non-return valve, said valve comprising a system for opening the valve when the pressure of said liquid, at said valve, exceeds a predetermined pressure threshold, said non-return valve comprising a means for opening the non-return valve when the pressure of the fluid flowing through said central cylinder exceeds the pressure of the other fluid, at said non-return valve.

According to a variant of the system of the invention, said system comprises a sealing means at the foot of the volume where no liquid/gas mixing occurs. Preferably, said sealing means is an annular element when the volume where said liquid/gas mixture forms is said central volume or said sealing means is a cylindrical element when the volume where said liquid/gas mixture forms is said annular volume.

According to an embodiment of the system of the invention, said system comprises a restriction means, said restriction means being positioned above said radial passage means, in the volume where said liquid/gas mixture forms.

Preferably, said at least two radial passage means are evenly distributed along said well.

Advantageously, said valve is calibrated by a gas charge equal to said predetermined pressure threshold.

The invention also relates to the use of the method or of the system according to any of the above features for a geothermal energy or $CO_2$ storage application.

BRIEF DESCRIPTION OF THE FIGURES

Other features and advantages of the method and of the system according to the invention will be clear from reading the description hereafter of embodiments given by way of non-limitative example, with reference to the accompanying figures wherein:

FIG. 2 illustrates the reduction in the gas injection pressure at the wellhead by means of the system/method according to the invention, FIG. 3a illustrates another embodiment of the system according to the invention, FIG. 4 shows a block diagram of an embodiment of the method according to the invention, FIG. 5a shows a graph of pressure evolution as a function of depth according to an embodiment of the method, according to a first step, FIG. 5b shows a graph of pressure evolution as a function of depth according to an embodiment of the method, according to another step, FIG. 5c shows a graph of pressure evolution as a function of depth according to an embodiment of the method, according to another step, FIG. 5d shows a graph of pressure evolution as a function of depth according to an embodiment of the method, according to another step, and FIG. 6 illustrates the pressure evolution for a method of the prior art and a method according to the invention.

DETAILED DESCRIPTION OF THE INVENTION

Figure 1:
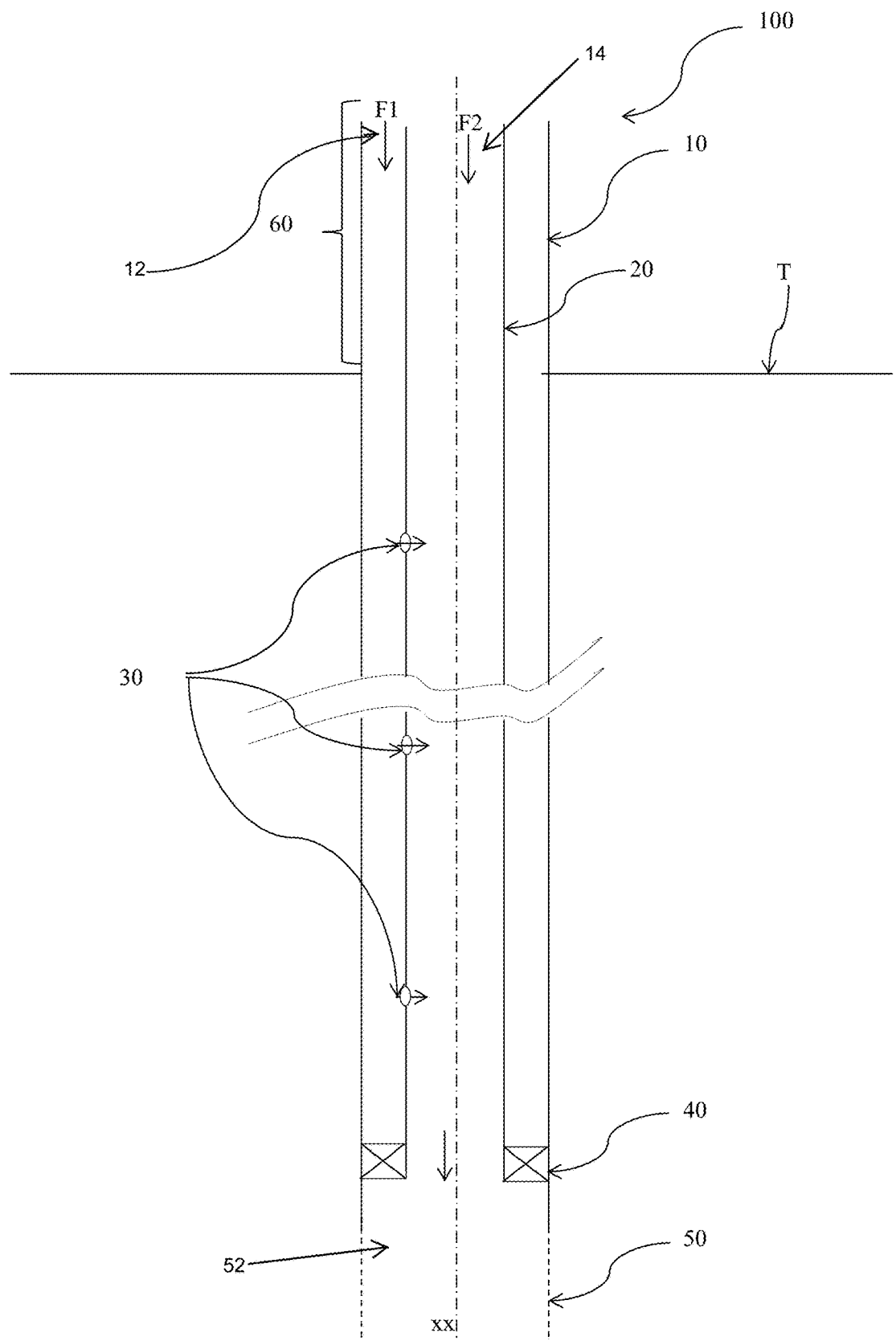
FIG. 1 illustrates an embodiment of the system according to the invention.

The invention relates to a method for injecting gas into an underground formation through a well. The well comprises two coaxial cylinders delimiting a central volume and an annular volume. These two volumes are thus separated from one another by the wall formed by the central cylinder. The outer cylinder, of larger diameter, can for example correspond to the well casing; the inner cylinder, of smaller diameter, can for example correspond to the well tubing and it can extend substantially over the entire length of the well. The casing is the cylindrical shell set immediately after drilling to secure the well thus formed. It is generally constructed from cementing. Several casings successively fit together for construction of a well. The tubing is generally a metal tube run into the well. It is used for completion of the well. Completion refers to the equipment used to bring the well to the completion state and enable safe operation thereof (fluid production and/or injection). The diameter of the tubing allows to use a slickline for remote maintenance work (valve disassembly, plug setting, pressure and/or temperature measurement for example) in the tubing, from the wellhead, by running the required maintenance tools into the tubing. The minimum inside diameter for the tubing is about 45 mm to allow passage of the slickline. The tools are then guided by the slickline by means of a winch, hence the designation "slickline intervention".

In the upper part thereof, the well comprises a wellhead extending above ground. Furthermore, the well comprises an outlet in the underground formation. The wellhead includes at least one liquid inlet and at least one gas inlet providing circulation of each fluid from distinct inlets towards a common gas/liquid mixture outlet, positioned in the lower part of the well for feeding the liquid/gas mixture into the underground formation.

In the lower part thereof, the well is in the underground formation. It may consist of an extension of the casing, which comprises in this zone multiple radial ports allowing radial flow of the gas/liquid mixture into the underground formation. Furthermore, the gas/liquid mixture can also flow vertically into the underground formation, as the casing can be left open at the lower longitudinal end thereof, the well being qualified as an open hole in the lower part thereof.

According to the invention, the method comprises the following steps:

a) injecting the liquid from at least one liquid inlet and the gas from at least one gas inlet, one into the central volume and the other into the annular volume. Thus, the two fluids are injected separately and distinctly into two volumes. They can therefore not mix together upon injection.

The liquid and the gas are mixed together. Several injection points distributed along said central cylinder are therefore opened or closed so as to drive one of the two fluids radially through the central cylinder. To enable injection, at least one injection point is in open position during the operation.

An injection point is understood to be an injection level (in the sense of altitude) longitudinally in the well. Thus, the injection point comprises a single injection altitude, along the longitudinal axis of the well. It may however comprise several radial injection positions on this altitude, for example, the injection point can have 4 radial injection positions at 0°, 90°, 180° and 270°, or slightly vertically spaced (preferably an altitude difference of less than 10 meters between the shallowest and the deepest position). The diameters of the injection points may also be modified through slickline intervention to promote liquid/gas mixing.

The open/closed status of the various injection points can either evolve during the operation, or remain unchanged during the operation. Thus, the proposed system is particularly modular. The depth of the injections can notably be changed through injection point opening/closing means according to the conditions observed in situ. This modularity is made possible by the multiplicity of injection points distributed over the well.

Opening/closing of the injection points can be performed "manually" using an equipment connected to the slickline and the setting/removal of a preventer, or by remote control, for example via automatic electric controls, or using specific valves with a trigger threshold and possibly with a non-return valve.

Once the fluid concerned has flowed through the wall represented by the central cylinder, which serves as a separator between the central volume and the annular volume, it joins the other fluid initially present in this volume. In what follows, the fluid flowing through the central cylinder is referred to as Fluid1 and the fluid that does not flow through the central cylinder is referred to as Fluid2. Fluid2 thus remains in the volume into which it has been injected at the wellhead.

Once Fluid1 has flowed through the central cylinder, liquid/gas mixing is possible. Fluid1 then changes circulation volume while Fluid2 flows, from the inlet to the outlet thereof, through the same volume.

Using multiple injection points provides flexibility for operating in different situations and facilitates starting operations. It also allows to secure the two-phase flow of the liquid/gas mixture where the gas is only slightly dissolved in the liquid or not at all.

b) discharging a liquid/gas mixture thus obtained at the gas/liquid mixture outlet to transfer and inject it into the underground formation. The gas is then stored in the underground formation, thus preventing discharge into the atmosphere of toxic gases and/or greenhouse gases such as $CO_2$, $H_2S$ or natural gases.

Generally, the liquid is water or brine. The gas is generally a non-condensable gas, a toxic gas or a greenhouse gas, for example $CO_2$, $H_2S$, natural gases or mixtures thereof.

Preferably, opening/closing of the injection points can follow an opening/closing sequence. Thus, the sequence can be automatically predefined or manually activated by an equipment connected to the slickline.

Advantageously, the opening/closing sequence can include the opening of an injection point that occurs, on the one hand, when the pressure of the fluid flowing through the central cylinder is higher than the pressure of the other fluid, at the injection point considered, and on the other hand when the pressure of the liquid is above a predetermined pressure threshold, at the injection point considered.

Indeed, when the liquid pressure is above a given threshold, one can ensure that the level of the liquid column exceeds the injection point. Injecting gas into such a liquid column (water for example) promotes liquid/gas mixing and helps achieve a two-phase flow.

Furthermore, providing a pressure for Fluid1 higher than the pressure of Fluid2 ensures that Fluid2 can actually not change circulation space (the circulation space being the central volume or the annular volume), the pressure difference being unfavourable thereto.

According to an embodiment of the method of the invention, the predetermined pressure threshold may be different for each injection point. The variation of this parameter along the well can allow the gas injection performances to be improved.

In a first embodiment of the method according to the invention:

a) the liquid can be separately injected into the central volume and the gas into the annular volume, b) the liquid and the gas can be mixed by causing the gas to flow radially through the central cylinder from the annular volume to the central volume, by opening at least one injection point among the at least two injection points distributed along the central cylinder. The liquid remains in the central volume, the liquid/gas mixture outlet being located at the foot of the central volume, c) the liquid/gas mixture thus obtained can be discharged at the gas/liquid mixture outlet.

This embodiment is particularly advantageous. Indeed, it provides efficient recompression of the liquid column contained in the central volume by injecting the gas into the column, thus allowing the gas injection pressure at the wellhead to be limited.

Besides, injecting the gas into a stable liquid column promotes mixing and two-phase flow.

Furthermore, this solution facilitates starting operations by limiting the gas injection pressure required at the wellhead, the liquid column having a higher hydrostatic pressure gradient than the gas.

According to a second embodiment of the method of the invention:

a) the liquid can be separately injected into the central volume and the gas into the annular volume, b) the liquid and the gas can be mixed by causing the liquid to flow radially through the central cylinder from the central volume to the annular volume through at least two injection points distributed along the central cylinder, the liquid/gas mixture outlet being located at the foot of the central volume, c) the liquid/gas mixture thus obtained can be discharged at the gas/liquid mixture outlet, the liquid/gas mixture outlet being located at the foot of the annular volume.

According to a third embodiment of the method of the invention:

a) the liquid can be separately injected into the annular volume and the gas into the central volume, b) the liquid and the gas can be mixed by causing the liquid to flow radially through the central cylinder from the annular volume to the central volume through at least two injection points distributed along the central cylinder, the liquid/gas mixture outlet being located at the foot of the central volume, c) the liquid/gas mixture thus obtained can be discharged at the gas/liquid mixture outlet, the liquid/gas mixture outlet being located at the foot of the central volume.

According to a fourth embodiment of the method of the invention:

a) the liquid can be separately injected into the annular volume and the gas into the central volume, b) the liquid and the gas can be mixed by causing the gas to flow radially through the central cylinder from the central volume to the annular volume through at least two injection points distributed along the central cylinder, the liquid/gas mixture outlet being located at the foot of the central volume, c) the liquid/gas mixture thus obtained can be discharged at the gas/liquid mixture outlet, the liquid/gas mixture outlet being located at the foot of the annular volume.

In this case, after flowing through the central cylinder, the gas is injected into the liquid column formed in the annular volume. Gas injection at an altitude below the water column surface (the surface of the water column corresponds to the air/water interface of the water column) promotes mixing and secures the two-phase flow.

Advantageously, the liquid and the gas can be mixed through at least two injection points evenly distributed on the central cylinder, along the well. Evenly distributed means that the injection points are longitudinally spaced at least several meters apart, preferably at least ten meters, or even at least one hundred meters.

The operations of starting gas injection into the underground formation are thus facilited. Indeed, by using a first injection point in the lower part, liquid/gas mixing can begin in a liquid column of relatively low height, which facilitates injection start, notably when the well injectivity is high (injectivity is the absorption capacity of the well to receive and flow fluids in the underground formation). When the liquid/gas mixture forms after starting gas injection into the liquid column, the liquid/gas mixture has a hydrostatic pressure gradient between that of the liquid and that of the gas. This causes the surface of the liquid column to rise in the volume concerned since the pressure at the injection point increases due to the column lightening effect.

The gas can then be injected through an injection point located at a higher level in the well and a mixture can gradually form over a substantial portion of the well as far as the downhole injectivity conditions allow.

Furthermore, using injection points evenly distributed over the central cylinder, along the well, can provide flexibility of the system depending on the gas, the liquid, the solubility characteristics of one in the other, the fluid injectivity (well injectivity being its capacity to feed the mixture into the underground formation. It depends both on the fluids involved and the porosity/permeation characteristics of the underground formation).

Preferably, the opening/closing sequence can comprise successive openings of the various injection points, from the lowest injection point of the well to the highest injection point of the well. This feature facilitates the start of gas injection into the underground formation by using, due to the presence of a liquid column and its favourable hydrostatic pressure gradient, a reduced gas injection pressure at the wellhead. Upon rise of the liquid column induced by the formation of the liquid/gas mixture, gas injection can then be performed through an injection point located at a higher level in the well, without having to increase the gas injection pressure.

Advantageously, the opening/closing sequence can also comprise successive closings of the injection points, from the lowest injection point of the well to the highest injection point of the well. Indeed, upon rise of the liquid column induced by the formation of the liquid/gas mixture, gas injection can then be performed through an injection point located at a higher level in the well, without having to increase the gas injection pressure. The injection point located at a lower level can therefore be closed, thus avoiding the need to use a higher gas pressure for injection into the column on the one hand, and preventing the liquid/gas mixture formed from entering the other volume through this injection point if the pressure of the liquid/gas mixture at the altitude of the injection point concerned becomes higher than that of the gas at the same altitude.

These successive closings can take place simultaneously with the successive openings or with a slight lag. For example, the successive closings can occur shortly after the successive openings: thus, over a short period, two points may be open simultaneously. This avoids having to stop gas injection, which might hinder maintenance of the two-phase flow.

According to a variant of the method of the invention, during the step of mixing the liquid and the gas, the gas flow rate can be progressively increased. It is thus possible to control the formation of the mixture and/or the level of the column of mixture produced, and the introduction, or not, of Fluid1 into Fluid2 through the multiple injection points. This variant is particularly interesting for implementing a passive opening/closing control of the various injection points by means of the relative and/or absolute pressures and/or flow rates generated.

Alternatively, during the liquid and gas mixing step, the gas injection pressure can be controlled. Passive control of the injection point openings/closings can thus be achieved by means of the relative and/or absolute pressures.

Opening/closing of the injection points can also be controlled via a specific control device, pilot-operated valves for example. This specific feature enables opening and/or closing of the injection points upon user request. It may prove beneficial when the behaviour of the mixture is not as expected or under abnormal operating conditions such as injectivity variations of the underground formation. It thus provides greater operating flexibility to the facility.

Preferably, the superficial flow velocities of the fluids are greater than 1 m/s. The superficial velocity of a fluid is defined as the ratio of the flow rate of the phase of this fluid, alone, to the cross-sectional area where this phase circulates. It thus corresponds to the average velocity of this phase if it were the only phase flowing in the cross-sectional area concerned. Thus, the circulation conditions are favourable to the entrainment of the gas by the liquid phase and the formation of a two-phase flow providing good recompression.

The invention also relates to a system for injecting gas into an underground formation for implementing the method according to one of the above features. This system notably comprises a well that itself comprises at least two coaxial cylinders delimiting a central volume and an annular volume. These cylinders can notably be the well casing and tubing that are set after well drilling and completion. In the upper part thereof, the well comprises a wellhead extending above ground. This wellhead notably comprises a gas inlet and a liquid inlet. At the foot of the well, the well comprises a gas/liquid mixture outlet for feeding the liquid/gas mixture formed in the well into the underground formation. The system comprises a means of carrying the gas from the gas inlet to the liquid/gas mixture outlet, a means of carrying the liquid from the liquid inlet to the liquid/gas mixture outlet, a liquid injection means in the wellhead for injecting the liquid into one of the two volumes and a gas injection means in the wellhead for injecting the gas into the other volume. The system comprises at least two means for radial passage of one of the fluids through the central cylinder, distributed along the well. The radial passage means provide the injection points for injecting one of the two fluids into the other. The radial passage means therefore comprise opening and closing means that may be, for example, non-return valves and/or opening/closing valves for example. Distributed along the well means that the radial passage means are longitudinally spaced on the central cylinder, the spacing representing a significant zone of the central cylinder. For example, the longitudinal spacing between the radial passage means can be several meters, preferably at least ten meters, and more preferably several hundred meters.

At least two radial passage means are used in order to improve the flexibility of use and operation of the well on the one hand and to facilitate starting the facility on the other hand.

Preferably, the radial passage means can comprise at least a valve and a non-return valve. The valve can notably include an opening system when the pressure of the liquid at this valve exceeds a predetermined pressure threshold. Thus, the valve can open for example only when the level of the liquid column above the valve is sufficient. Furthermore, the non-return valve comprises a means for opening the valve when the pressure of the fluid flowing through the central cylinder exceeds the pressure of the other fluid, at the non-return valve. The non-return valve notably prevents Fluid2 from joining the volume into which Fluid1 is initially injected.

The non-return valve communicates with the volume of Fluid1 on one side and with an intermediate chamber, which itself communicates with the valve. The valve communicates with the volume of Fluid2 on the one hand and with the intermediate chamber communicating with the non-return valve. The intermediate chamber can contain Fluid1 or Fluid2.

Preferably, the valve is calibrated by a gas charge whose pressure is equal to the predetermined pressure threshold. The valve therefore achieves passive control.

Advantageously, the system can comprise a sealing means at the foot of the volume where no liquid/gas mixing occurs. Preferably, the sealing means is an annular element when the volume where the liquid/gas mixture forms is the central volume.

Preferably, the sealing means is a cylindrical element when the volume where the liquid/gas mixture forms is the annular volume.

The sealing means, a packer for example, thus allows to seal the bottom of the volume where no mixture forms. Thus, the fluid contained in this volume is forced to flow through the central cylinder by the means dedicated thereto. Thus, control of the liquid/gas exchanges is improved. The liquid and gas flow rates are also better controlled due to the presence of the sealing means. Furthermore, this sealing means prevents "closed-loop" circulation of the gas: indeed, the gas that is not entrained into the reservoir might flow back into the volume where no liquid/gas mixture should normally form and thus circulate in a closed loop between the injection point and the lower part of the well.

Preferably, the system can also comprise a restriction means positioned above the radial passage means, in the volume where the liquid/gas mixture forms. If the volume where the liquid/gas mixture forms is the central volume, this restriction means can be a means of restricting the inside diameter of the central cylinder. If the volume where the liquid/gas mixture forms is the annular volume, this restriction means can be a restriction means comprising a local restriction of the diameter of the outer cylinder and/or a local enlargement of the outside diameter of the central cylinder. This restriction means can be a valve for example. Thus, the cross-sectional area of flow into the volume considered, whether the central volume or the annular volume, is locally reduced. The position of this restriction means at a longitudinal level of the well, above the level of the radial passage means, allows to prevent the gas, once the liquid/gas mixture produced, from rising up the column, for example if the superficial velocities are too low (below 1 m/s), in the opposite direction from that expected, the expected direction being towards the liquid/gas mixture outlet located at the foot of the well, in the zone where the mixture is fed into the underground formation.

Advantageously, the at least two radial passage means are evenly distributed along the well. In other words, the various radial passages are longitudinally spaced, with a substantially constant length, preferably a length of at least ten meters and more preferably at least one hundred meters. This feature allows to facilitate the start of gas injection into the underground formation.

The system and the method according to the invention allow to reduce the gas injection pressure at the wellhead, thus allowing to reduce the cost of the associated compression means and the energy consumption, notably upon injection start.

FIG. 1 schematically illustrates, by way of non-limitative example, an embodiment of the system and of the method according to the invention. System 100 consists of a well comprising at least an outer cylinder 10 and an inner cylinder, also referred to as central cylinder, 20. These two cylinders are coaxial, of axis xx, also corresponding to the axis of the well.

Outer cylinder 10 can be a well casing, i.e. the part of the well that has been cemented immediately after drilling to secure the well; inner cylinder 20 can be the well completion tubing used for gas injection or production.

In this figure, reference T represents the ground level. Thus, the well is provided with a wellhead 60 that is the part of the well located above ground level T.

A first fluid F1 is injected into the wellhead through a first inlet 12. A second fluid F2 is also injected into the wellhead through a second inlet 14. One of these two fluids, F1 or F2, is a gas, the other is a liquid. Preferably, this liquid is water or brine. The gas is preferably a toxic gas or a greenhouse gas such as $CO_2$, $H_2S$ or natural gases.

Fluid F1 circulates in the annular space contained between outer cylinder 10 and inner cylinder 20, whereas fluid F2 circulates in inner cylinder 20. According to an alternative, the opposite is possible.

At the foot of the well, outer cylinder 10 can be extended by a part 50 provided with several radial ports, over several longitudinal levels, so that the liquid/gas mixture can enter the underground formation through outlet 52.

At the well bottom, at the lower end of inner cylinder 20, a sealing means 40 consisting for example of a packer is arranged between outer cylinder 10 and inner cylinder 20. Thus, fluid F1 contained in the annular space cannot rise in inner cylinder 20. It is blocked in the annular space delimited by the two cylinders 10 and 20 and by sealing means 40.

Finally, central cylinder 20 comprises several radial passage means 30 distributed over central cylinder 20. These radial passage means allow one of the two fluids, fluid F1 for example, to flow radially through central cylinder 20 and thus to flow into the volume initially containing only fluid F2. Thus, mixing of F1 and F2 starts as soon as F1 flows radially into the volume containing F2 (in FIG. 1, it is the central volume contained in central cylinder 20). Circulation of F2 occurs along longitudinal axis xx of the well. Thus, at the beginning of the mixing phase, the two fluids have orthogonal directions of flow promoting liquid/gas mixing. The two fluids then flow towards the outlet positioned in the lower part of the well. The two-phase mixture then has a substantially longitudinal direction of flow.

FIG. 2 schematically illustrates, by way of non-limitative example, the impact on the gas injection pressure reduction at the wellhead by means of the system and the method according to the invention in relation to the system of the prior art.

FIG. 2 shows the evolution of pressure P on the x-axis as a function of depth D on the y-axis, the direction of the y-axis running towards the well bottom whereas level 0 corresponds to the ground level.

Curve C1 corresponds to the evolution of the gas pressure as a function of depth in case of a direct injection according to the prior art. The curve is defined, on the one hand, by the pressure prevailing in the underground formation and the injectivity thereof and, on the other hand, by the hydrostatic gradient of the gas. This hydrostatic gradient corresponds to the slope of curve C1. For a gas, this gradient is low, curve C1 is close to the vertical, therefore the injection pressure is high at the wellhead.

The slope of curve C2 corresponds to the hydrostatic gradient of the liquid part. Curve C2 is much more inclined than curve C1 because the hydrostatic gradient of the liquid is higher than that of the gas (due to the density difference). Thus, if a liquid were to be injected into the well, the injection pressure of the liquid at the wellhead would be much lower, or even zero (wellhead vacuum zone), than the injection pressure of the gas to obtain the same pressure at the well bottom.

Within the context of the system and the method according to the invention, FIG. 2 schematically shows an injection point in order to understand the operation of the system and the method.

Curve C2 represents the injection of liquid from the wellhead to point I. Point I will be discussed in more detail below.

Curve C1' represents the injection of gas from the wellhead to an altitude of same level as point I (same ordinate D). Curve C1' is substantially parallel to curve C1 because the hydrostatic gradient is an intrinsic characteristic of the gas, except for the density variations and pressure drops, induced by the pressure reduction.

At the altitude of point I, a radial passage means is positioned on the central cylinder for carrying one of the fluids through the central cylinder so as to mix it with the second fluid.

When the pressure of the gas at the altitude of point I of the injection point exceeds the pressure of the liquid, corresponding to the abscissa of point I, at the same altitude of point I, the method allows passage of the gas through the central cylinder in order to mix with the liquid, which is the case in FIG. 2. Alternatively, a reverse flow path of liquid towards the gas is possible.

After feeding the gas into the liquid column, the two-phase liquid/gas mixture forms. The hydrostatic gradient of this mixture is intermediate between that of the liquid and that of the gas. Thus, the slope of curve C3 corresponding to the liquid/gas mixture formed at an altitude below the injection point, at an altitude below point I, is intermediate between the slope of C2 and the slope of C1 or C1', subject to hydrodynamic conditions of gas entrainment by the liquid.

It is thus observed that, when using a two-phase mixture, the gas pressure required for injection at the wellhead, P2, is significantly lower than the gas pressure required at the wellhead, P1, with direct gas injection into the well. G corresponds to the reduction of this pressure by means of the method or the system according to the invention.

FIG. 3a schematically shows, by way of non-limitative example, another embodiment of the system and of the method according to the invention.

In this figure, the references of same designation as those of FIG. 1 correspond to the same elements.

In this example embodiment, fluid F1 is the gas and fluid F2 is the liquid.

The radial passage means are here valve/non-return valve assemblies 35 enabling radial passage of the gas through central cylinder 20 into the central volume. In this valve/non-return valve assembly 35, a valve opens when the pressure of the liquid contained in inner cylinder 20, at the level of the valve, exceeds a predetermined pressure threshold. For example, this pressure threshold corresponds to a liquid level in the liquid column that forms in inner cylinder 20. This pressure threshold is used to ensure that the liquid level is above the level of valve/non-return valve assembly 35, in order to provide gas injection into a column filled with liquid. Thus, mixing of the gas and of the liquid is improved. The valve closes (or closes again) when the liquid pressure, at the valve level, is below the predetermined pressure threshold.

Once the valve of valve/non-return valve assembly 35 open, the non-return valve of valve/non-return valve assembly 35 opens when the existing gas pressure exceeds the liquid pressure at the non-return valve. This ensures that gas injection into the liquid is possible on the one hand, and that liquid injection into the gas is made difficult. When the pressure of the liquid or of the gas/liquid mixture is higher than the gas pressure, at the non-return valve, the non-return valve closes.

Preferably, the non-return valve and the valve of valve/non-return valve assembly 35 are substantially at the same level in the well.

In system 100 of FIG. 3a, it is observed that only second valve/non-return valve assembly 35, from the bottom of the well, is open. The other valve/non-return valve assemblies 35 are closed. Thus, the gas can only pass through the second valve/non-return valve assembly from the well bottom. Above the level of second valve/non-return valve assembly 35, there is a height in inner cylinder 20 where the column is only filled with liquid L. Then, below this part filled with liquid L, the column is filled with a flowing liquid/gas mixture L+G. The part above the liquid part is a water and vapour mixing zone at the vapour pressure of the water where the water falls down the central cylinder until it reaches the liquid recompression zone L, then the liquid/gas mixture zone L+G.

FIG. 3a shows three valve/non-return valve assemblies 35 corresponding to three levels longitudinally along axis xx of the well. At the two upper levels, valve/non-return valve assembly 35 is made up of several elements radially positioned around the section of inner cylinder 20. Preferably, these elements are evenly spaced radially around inner cylinder 20. For example, there can be two elements spaced 180° apart or four elements spaced every 90°. Even radial spacing allows to improve injection and mixing of the gas in the liquid so as to obtain a liquid/gas mixture L+G as homogeneous as possible. Specific internal equipments such as, for example, a convergent/divergent system of the type described in patent application JP-2,899,604, can also be added to facilitate liquid/gas or gas/liquid mixing.

Figure 3B:
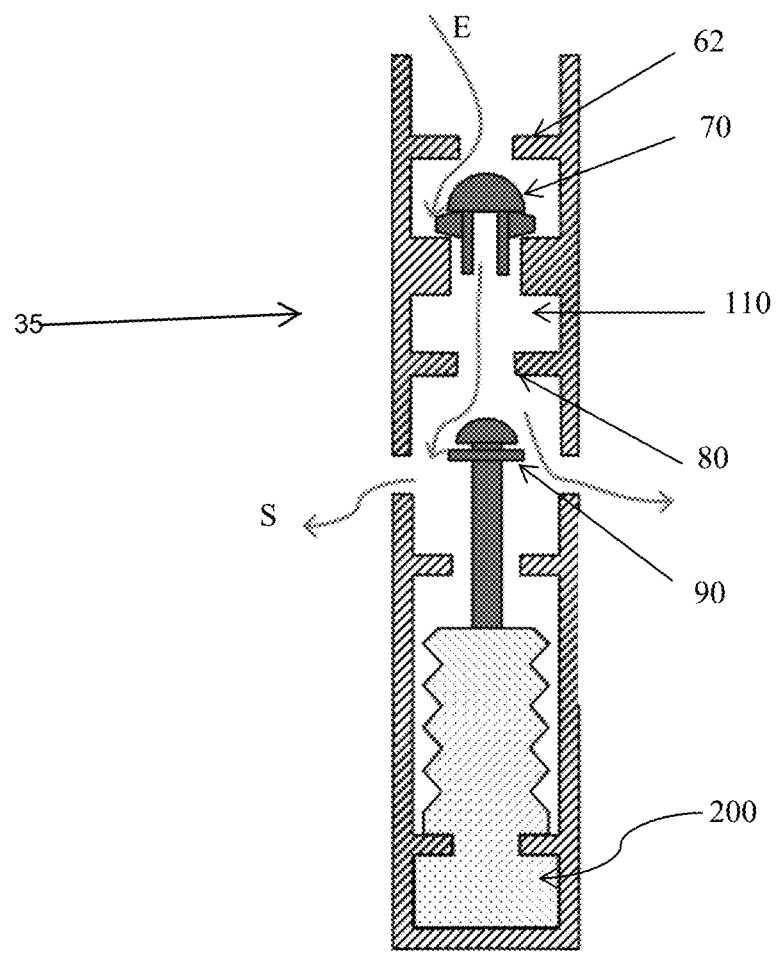
FIG. 3b illustrates an embodiment of a radial passage means of the system according to the invention.

FIG. 3b schematically shows, by way of non-limitative example, a schematic element of valve/non-return valve assembly 35. This element comprises a non-return valve 70. In FIG. 3b, the non-return valve is shown in open position. When it closes, for example when the gas pressure is lower than the liquid pressure, it comes to rest on the seat of port 62.

The element also comprises a valve 90 shown in open position in the figure. When it closes, for example when the liquid pressure is lower than a predetermined pressure threshold, valve 90 comes to rest on the seat of valve 80.

Valve 90 and non-return valve 70 can be substantially coaxial. The gas flowing in at point E first encounters non-return valve 70 and, when the valve opens, the gas passes into valve 90 and flows out at point S to encounter the liquid.

Valve 90 is set at a predetermined pressure threshold by a gas charge contained in volume 200. Valve 90 can be a clapper valve.

An intermediate chamber 110 can communicate with both non-return valve 70 and valve 90. It can contain Fluid1 or Fluid2. Non-return valve 70 communicates on the other side, i.e. at inlet E, with the volume containing Fluid1. Valve 90 communicates with the volume of Fluid2 at outlet S. Immediately after outlet S, Fluid1 coming from inlet E flows into the volume of Fluid2, thus mixing therewith.

FIG. 4 schematically shows, by way of non-limitative example, a block diagram of an embodiment of the method according to the invention.

In this figure, the well is assumed to have three valve/non-return valve assemblies, spaced along the axis of the well. The system used for this method can correspond to the system of FIG. 3a.

The first step consists in starting the injection of liquid IL into the inner cylinder, so as to create a liquid column in this cylinder. Liquid injection continues throughout the process, possibly with temporary interruptions.

When the height of liquid in the inner cylinder is sufficient, the valve of the first valve/non-return valve assembly opens. It is the opening step of valve No.1, from the well bottom, OGL1.

Once OGL1 established, the injection of gas IG1 can start with a given gas flow rate.

When the gas pressure in the annular space consisting of the space between the inner and outer cylinders is higher than the pressure of the liquid contained in the inner cylinder, opening of non-return valve No.1, from the well bottom, OCNR1 occurs.

Injection of gas into the liquid (mixing) starts and requires increasing gas flow rate AIG1. Gas injection into the liquid modifies the density of the liquid/gas mixture. Therefore, the pressure at the injection point rises progressively as the gas lightens the mixture column and, thus, the level of the liquid column above the injection point rises.

The level of the liquid column in the inner cylinder continues to rise and when the pressure of the liquid or of the liquid/gas mixture at the valve of the second valve/non-return valve assembly, from the well bottom, exceeds a pressure threshold, which can be equal to or different from the predetermined pressure threshold of the first valve, starting from the well bottom, the second valve opens OGL2.

Then, when the gas pressure at the second non-return valve, from the well bottom, is higher than the liquid (or liquid/gas mixture) pressure, opening of the non-return valve OCNR2 occurs and induces closing of the first non-return valve, from the well bottom, FCNR1.

Once again, the gas injection rate is increased AIG2. The density of the liquid/gas mixture column decreases again and, therefore, the level of the liquid/gas mixture column in the central cylinder rises again.

When the pressure of the liquid/gas mixture or of the liquid reaches the predetermined pressure threshold of valve No.3, i.e. the highest valve, valve No.3 opens. This is the opening step of valve No.3, OGL3.

When the gas pressure exceeds the pressure within the inner cylinder, at the non-return valve, opening of non-return valve No.3, i.e. the highest non-return valve in the well, occurs OCNR3, thus causing closing of non-return valve No.2 FCNR2.

Injection of gas into the well then continues in steady-state regime through the third valve/non-return valve assembly.

FIGS. 5a to 5d schematically show, by way of non-limitative example, the evolution of pressure P as a function of well depth D during the phase of starting gas injection into the underground formation according to an embodiment of the method of the invention. The injection method can be in accordance with the block diagram of FIG. 4. In these figures, identical references correspond to the same data and are therefore not necessarily explained again in each figure. Furthermore, these figures are constructed in the same manner as FIG. 2.

FIG. 5a corresponds to the injection of liquid alone. The three curves 1, 2 and 3 correspond to three successive instants during the injection of liquid alone from the wellhead. Thus, the liquid level changes from H1 to H2, then H3, depending on the injectivity of the well. It is observed that, when the column reaches level H3, the pressure of curve No.3, at depth DV1 corresponding to the installation altitude of the first valve/non-return valve assembly, slightly exceeds the predetermined pressure threshold PV1 of this first valve. Thus, the opening of valve No.1 OGL1 is established. Injection of gas into the annular space can then start.

FIG. 5b shows gas injection curve 4. The slope of curve 4 is straighter than that of curves 1, 2 and 3 of FIG. 5a because the hydrostatic gradient of the gas is significantly lower than that of the liquid.

FIG. 5c shows the evolution of the curves after gas injection into the liquid column has started. The previous curve 3 (dotted line) has become curve 5. Indeed, during gas injection into the liquid, the density of the liquid/gas mixture is between that of the liquid and that of the gas. Therefore, the hydrostatic gradient of the mixture is also between that of the gas and that of the liquid. Thus, the slope of curve 5 changes and the angle of this curve with respect to the vertical axis (corresponding to the axis of depth D) is between the angle of curve 4' and that of curve 3.

Curve 4' is substantially parallel to curve 4 but, as the pressure at the injection point has increased with the lightening of the column, the gas annulus pressure is increased to ensure the injection flow rate and curve 4' thus is translated to the right. Thus, the wellhead injection pressure is increased.

In this figure, a bend is observed at point DV1. Below this point, the pressure follows curve 5 and above, it follows curve 3' parallel to curve 3.

Indeed, upon gas injection into the liquid, the column becomes lighter, therefore the level of the column rises.

Above DV1, the column is only liquid and the pressure thus follows evolution 3' with substantially the same hydrostatic gradient and therefore the same slope as curve 3.

Below this point DV1, the column is a liquid/gas mixture whose hydrostatic gradient is an intermediate value between the hydrostatic gradient of the liquid and that of the gas.

It is noted that the pressure in the column (curves 3' and 5) is slightly higher than pressure threshold PV2 of the second valve, starting from the bottom, at altitude DV2 of this second valve, which causes opening of the second valve OGL2.

Furthermore, the gas injection pressure following curve 4' exceeds the pressure of the mixture in the inner cylinder defined by curves 3' and 5, at altitude DV2 of the non-return valve and of the valve. Thus, opening of the non-return valve CNR2 occurs. Gas injection can therefore take place through this second level.

In FIG. 5d, it is observed that the gas pressure following curve 4" becomes lower than the internal pressure of the inner cylinder, shown by curves 3" and 5", at altitude DV1 of non-return valve 1, which causes closing of this non-return valve.

The steps of FIGS. 5a to 5d are repeated in a similar manner for the upper levels of the valve/non-return valve assemblies. Furthermore, in these examples, gas injection is controlled by the injection flow rate, but it may be controlled in a similar manner by the gas pressure in the annulus.

An example of application to geothermal energy is detailed here. This example uses the principle of the system of FIG. 3a with the liquid, water, injected into the central volume and the non-condensable gases injected into the annular volume. The water comes from a method of recovering energy from underground steam extracted through a production well. The water is then reintroduced into the underground formation, which is notably necessary for a geothermal energy application. The non-condensable gases from the underground formation, recovered with the steam, can be toxic or greenhouse gases. To prevent polluting emissions, it is interesting to reintroduce them into the underground formation.

The method according to the invention allows to limit the reinjection power of the two fluids by ensuring an extended and stable liquid/gas flow, and it therefore increases the performance of the geothermal energy system (energy recovery and injection of the fluids into the underground formation).

The method and the system according to the invention can also be used, by way of non-limitative example, for $CO_2$ storage in an aquifer or for simultaneous gas and water injection for pressure maintenance of oil reservoirs (enhanced recovery).

Example

Other features and advantages of the method and the system according to the invention will be clear from reading the example below.

The example relates to the combined reinjection of condensed water and of non-condensable gases whose characteristics are as follows:
the outer cylinder has an outside diameter of 168.3 mm and a thickness of 7.11 mm, reaching the reservoir cap rock at a depth of −2400 m and extended by an open hole zone of several tens of meters,
the inner cylinder has an outside diameter of 114.3 mm and a thickness of 6.02 mm,
the system includes a sealing means arranged between the inner cylinder and the outer cylinder, positioned at −2000 m. This sealing means allows the annulus to be isolated from the inner cylinder,
gas injection from the annulus to the inside of the inner cylinder occurs through a port at −1300 m,
several ports can be installed in the −2400 to −1300 m zone to ensure gas injection start as defined in the invention,
the nominal injection rate is 20 kg/s with 8% m non-condensable gases, which results in a normal water flow rate of 18.4 kg/s and a non-condensable gas flow rate of 1.6 kg/s,
the pressure of the underground formation is 65 bar with an injectivity of 1 kg/s/bar, i.e. a bottomhole pressure increase of 20 bar at nominal flow rate,
the wellhead injection temperature of the two fluids is 80° C.

The embodiment corresponds to that of FIG. 3a.

These gas reinjection conditions according to the invention are compared with a case of the prior art where the liquid and the gas are mixed only at the well bottom, just before being fed into the underground formation, the other parameters being identical.

FIG. 6 illustrates the pressure evolution results of this comparative study. The graph of FIG. 6 illustrates the evolution of pressure P, on the x-axis, as a function of depth D considered in the well, on the y-axis. Dotted curve 500 represents the gas pressure evolution according to the method of the prior art. Curve 600 represents the gas pressure evolution according to the method of the invention.

The required bottomhole gas pressure BHP is 85 bar at nominal injection rate.

According to the method of the prior art, the pressure required at the wellhead for direct gas reinjection G1 is 60.5 bar (curve 500 in FIG. 6). This well configuration consumes energy for gas surface compression and it requires expensive and bulky compression means.

According to the method of the invention, a liquid/gas mixing zone is forced in the inner cylinder over 1100 m, with secure hydrostatic recompression because the velocity conditions are favourable to gas entrainment by the liquid phase (gas and liquid superficial flow velocities above 1 m/s). The gas pressure required at the wellhead G2 is then reduced down to 31.5 bar (curve 600 in FIG. 6).

The method according to the invention thus allows to significantly reduce the pressure required at the wellhead while securing the hydrostatic recompression zone in the inner cylinder. The inner cylinder lengths, the position of the injection points and the number thereof can be optimized according to the characteristics of the reinjection site and to the desired reinjection flow rates.

The invention claimed is:

1. A method for injecting gas into an underground formation through a well, the well comprising two coaxial cylinders, a first coaxial cylinder delimiting a central volume and a second coaxial cylinder provided annularly around the first coaxial cylinder and defining with the first coaxial cylinder an annular volume provided annularly around the central volume, the well comprises a wellhead comprising a liquid inlet and a gas inlet, and a gas/liquid mixture outlet, gas flowing from the gas inlet to the liquid/gas mixture outlet and liquid flowing from the liquid inlet to the liquid/gas mixture outlet, characterized in that the method comprises the following steps:
a) injecting the liquid from the liquid inlet and the gas from the gas inlet separately, one of the liquid and gas being injected into the central volume and another of the liquid and gas being injected into the annular volume,
b) mixing the liquid and the gas by causing one of these two fluids to flow radially through the a wall of the first coaxial cylinder by opening or closing at least two injection points distributed along the wall of the first coaxial cylinder, wherein the injection points are communication ports between the central volume and the annular volume that allow injection of one of the fluids from one of the central volume and the annular volume into another of the central volume and the annular volume so as to create a mixing zone, and
c) discharging a liquid/gas mixture thus obtained at the gas/liquid mixture outlet to transfer it into the underground formation.

2. The method for injecting gas into an underground formation as claimed in claim 1 wherein, in step b), opening or closing of the at least two injection points is done in sequence.

3. The method for injecting gas into an underground formation as claimed in claim 1, wherein:
a) the liquid is separately injected into the central volume and the gas into the annular volume,
b) the liquid and the gas are mixed by causing the gas to flow radially through the central cylinder from the annular volume to the central volume by opening at least one injection point among at least two injection points distributed along the central cylinder,
c) the liquid/gas mixture thus obtained is discharged at the gas/liquid mixture outlet, the liquid/gas mixture outlet being located at a foot of the central volume.

4. The method for injecting gas into an underground formation as claimed in claim 1, wherein:
a) the liquid is separately injected into the central volume and the gas into the annular volume,
b) the liquid and the gas are mixed by causing the liquid to flow radially through the central cylinder from the central volume to the annular volume by opening at least one injection point among at least two injection points distributed along the central cylinder, c) the liquid/gas mixture thus obtained is discharged at the gas/liquid mixture outlet, the liquid/gas mixture outlet being located at a foot of the annular volume.

5. The method for injecting gas into an underground formation as claimed in claim 1, wherein:
a) the liquid is separately injected into the annular volume and the gas into the central volume,
b) the liquid and the gas are mixed by causing the liquid to flow radially through the central cylinder from the annular volume to the central volume by opening at least one injection point among at least two injection points distributed along the central cylinder,
c) the liquid/gas mixture thus obtained is discharged at the gas/liquid mixture outlet, the liquid/gas mixture outlet being located at a foot of the central volume.

6. The method for injecting gas into an underground formation as claimed in claim 1, wherein:
a) the liquid is separately injected into the annular volume and the gas into the central volume,
b) the liquid and the gas are mixed by causing the gas to flow radially through the central cylinder from the central volume to the annular volume by opening at least one injection point among at least two injection points distributed along the central cylinder,
c) the liquid/gas mixture thus obtained is discharged at the gas/liquid mixture outlet, the liquid/gas mixture outlet being located at a foot of the annular volume.

7. The method for injecting gas into an underground formation as claimed in claim 1, wherein the at least two injection points are evenly distributed on the wall of the first coaxial cylinder, along the well.

8. The method for injecting gas into an underground formation as claimed in claim 1 wherein, during the step of mixing the liquid and the gas, a rate of injection of the fluid flowing radially through the central cylinder is increased.

9. The method for injecting gas into an underground formation as claimed in claim 1 further comprising, during the step of mixing the liquid and the gas, controlling an injection pressure of the fluid flowing radially through the wall of the first coaxial cylinder.

10. The method for injecting gas into an underground formation as claimed in claim 1, wherein the superficial flow velocities of the liquid and the gas are greater than 1 m/s.

11. A geothermal energy or $CO_2$ storage application, comprising carrying out the method as claimed in claim 1.

12. The method for injecting gas into an underground formation as claimed in claim 1, wherein the opening or closing of the at least two injection points comprises opening of an injection point when a pressure of the fluid flowing through the central cylinder is higher than the pressure of the other fluid, at the injection point, and when a pressure of the liquid is higher than a predetermined pressure threshold, at the injection point.

13. The method for injecting gas into an underground formation as claimed in claim 12, wherein the predetermined pressure threshold is different for each injection point.

14. The method for injecting gas into an underground formation as claimed in claim 12, wherein the opening or closing of the at least two injection points comprises successive openings of the injection points starting from a lowest injection point of the well closest to a foot of the well to a highest injection point of the well furthest from a foot of the well.

15. The method for injecting gas into an underground formation as claimed in claim 14, wherein the opening or closing of the at least two injection points comprises successive closings of the injection points starting from a lowest injection point of the well closest to a foot of the well to a highest injection point of the well furthest from a foot of the well.

16. The system for injecting gas into an underground formation for implementing the method as claimed in claim 1, comprising a well, the well comprising two coaxial cylinders, a first coaxial cylinder delimiting a central volume and a second coaxial cylinder provided annularly around the first coaxial cylinder and defining with the first coaxial cylinder an annular volume provided annularly around the central volume, the well comprising a wellhead comprising a gas inlet and a liquid inlet, and a gas/liquid mixture outlet, the wellhead carrying the gas from the gas inlet to the liquid/gas mixture outlet, and carrying the liquid from the liquid inlet to the liquid/gas mixture outlet, the system comprising a liquid injection means in the wellhead for injecting the liquid into one of the central volume and the annular volume and a gas injection means in the wellhead for injecting the gas into the other of the central volume and the annular volume, characterized in that the system comprises at least two radial passages for one of the fluids through the central cylinder, the at least two radial passages being distributed along the well between the central volume and the annular volume and being configured to allow injection of one of the fluids from one of the central volume and the annular volume into another of the central volume and the annular volume so as to create a mixing zone.

17. The system as claimed in claim 16, wherein each of the radial passages comprises at least a valve and a non-return valve, the valve comprising a system for opening the valve when the pressure of the liquid, at the valve, exceeds a predetermined pressure threshold, the non-return valve comprising a means for opening the non-return valve when the pressure of the fluid flowing through the central cylinder exceeds the pressure of the other fluid, at the non-return valve.

18. The system as claimed in claim 16, wherein the system comprises a sealing means at a foot of the volume where no liquid/gas mixing occurs, wherein the sealing means is an annular element when the volume where the liquid/gas mixture forms is the central volume or the sealing means is a cylindrical element when the volume where the liquid/gas mixture forms is the annular volume.

19. The system as claimed in claim 16, wherein the system comprises a restriction means, the restriction means being positioned above the at least two radial passages, in the volume where the liquid/gas mixture forms.

20. The system as claimed in claim 16, wherein the at least two radial passages are evenly distributed along the well.

21. The system as claimed in claim 16, wherein the valve is calibrated by a gas charge equal to the predetermined pressure threshold.

* * * * *